Patented Nov. 14, 1950

2,529,935

UNITED STATES PATENT OFFICE 2,529,935

ACID-FADING INHIBITION USING CERTAIN 1,4-DIARYL PIPERAZINES

Harry W. Grimmel, Riegelsville, and Alfred Guenther, Easton, Pa., assignors to General Aniline & Film Corporation, New York, N. Y., a corporation of Delaware No Drawing. Application October 15, 1947, Serial No. 780,106

10 Claims. (Cl. 8—61)

The present invention relates to the treatment of dyeings on materials made of or containing organic derivatives of cellulose to improve the fastness thereof to gas fading.

The art has long been aware of the occurrence of gas fading in the field of dyed materials made of or containing cellulose esters or ethers. Many dyestuffs capable of yielding desirable shades on organic derivatives of cellulose suffer from the lack of fastness to gas fumes, for example, the gaseous products of combustion of coal or of illuminating gas, and particularly oxides of nitrogen. This weakness in the dyestuffs may show itself as a dulling of the brightness of the shade of the dyeing or, in some instances, a marked change in color may take place. This fading or discoloration is known as gas fading and variously, also, as acid, fume or atmospheric fading. Anthraquinone dyestuffs capable of yielding blue shades on celllulose esters or ethers are particularly susceptible to gas fading. When cellulose acetate dyed with one of these anthraquinone colors is exposed to the gas fumes, the color changes from a pure blue shade to one having a reddish or, in some instances, a brownish cast. On continued exposure to the fumes, the color may even change to a pink. It is to be understood, however, that gas fading is by no means limited to the anthraquinone dyestuffs. Such changes naturally restrict the range of usefulness of these dyestuffs and, accordingly, methods of increasing the resistance of these dyes or dyeings to gas fading are of great commercial importance.

The prior art has applied protective agents to dyeings of cellulose acetate, but almost without exception this has been done by after-treatment of the dyed material. In some cases, pretreatment of the cellulose acetate with the protective agent has been suggested. Seldom, however, has the protective agent been appleid in the dye bath simultaneously with the dyestuff. The simultaneous dyeing and treatment with a protective agent obviously would save time and money, and yet protective agents on the market today are not being so applied. It is apparent that, for one reason or another, they are not suited to such a simple and time saving method of application.

To be suitable for direct application in the dye bath, a protective agent must have the qualities of suitable solubility, natural affinity for the organic derivative of cellulose, capacity to be properly dispersed in water and a sufficiently high melting point. A large number of suggested materials fail to meet the solubility requirement since they are water-soluble and hence do not have a natural affinity for cellulose acetate. Such agents have been applied to cellulose acetate fabric by soaking the fabric in an aqueous solution of the same and then drying the wet goods. Any water-soluble agent applied in this way is obviously not fast to water washing and no claim has ever been made that they were. The requirement of a high melting point is necessary in order to avoid melting of the protective agent in the hot dye bath. Cellulose acetate is customarily dyed at temperatures of about 80–90° C. from a bath containing the dyestuff in aqueous dispersion which has been prepared with a water-immiscible organic solvent and a suitable dispersing agent. Should the compound melt in the dye bath, the dispersion of the dyestuff will usually break and the separating immiscible solvent, being a good solvent for the dyestuff, will take up much of the dispersed dyestuff. This would lead to poor dyeings which are streaked with intensely dyed spots where the dye-solvent solution had made contact with the goods. Many products previously proposed as protective agents were either liquids or very low melting point solids which obviously are useless for direct application in the dye bath for the reasons just stated.

In addition to the above-named conditions, there are the usual requirements of any anti-gas fading agent to be met. Such an agent must be substantially colorless, odorless, light-stable, not discolor on exposure to combustion gases, fast to dry-cleaning and water-washing and non-toxic to avoid skin irritation on contact with the treated goods.

We have found certain derivatives of piperazine to be excellent anti-gas fading agents for application to textile materials made of or containing organic derivatives of cellulose. These are the 1,4-diaryl piperazines of the general formula:

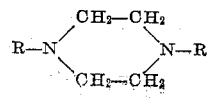

where R is a monovalent aromatic hydrocarbon radical, for example, phenyl, naphthyl, anthranyl, diphenyl, which further may contain substituents such as alkyl, alkoxy, halogen and cyano groups but which are free from water-solubilizing groups, for example, sulfo and carboxy groups.

These particular derivatives of piperazine are well suited to be applied to the fabric in a direct treatment, wherein the piperazine derivative and the dyestuff are applied simultaneously to the fabric from the same bath. However, these derivatives may also be applied to the fabric either before or after the dyeing operation with satisfactory results, if so desired. It is of special advantage, however, that they are suitable for simultaneous application with the dyestuff.

The piperazine compounds of the above general formula are in part known and described in the literature and may be prepared by reacting ethylene chloride or bromide with a primary aromatic amine in the presence of an acid binding agent such as calcined sodium carbonate. (Bischoff, Berichte 22, 1778.) The resulting piperazine compound is separated from the reaction mass and purified by recrystallization from an appropriate solvent, for instance, ethanol, acetone, chloroform or benzene, etc. These piperazine derivatives are white crystalline compounds melting at temperatures well above those used in dyeing cellulose esters or ethers. Illustrative of such are, 1,4-diphenyl piperazine, 1,4-di-o-tolyl-piperazine, 1,4-di-m-xylyl piperazine, 1,4-bis(p-methoxy phenyl)piperazine, 1,4-bis(p-ethoxyphenyl)piperazine, 1,4-bis(2,4,5-trimethyl-phenyl)piperazine, 1,4-di-α-naphthyl piperazine, 1,4-di-β-naphthyl piperazine, 1,4-bis(p-chlorphenyl)piperazine, 1,4-bis(p-cyanophenyl)-piperazine, 1,4-bis(p-diphenyl)piperazine, 1,4-bis(1-anthranyl)piperazine, 1,4-bis(9-anthranyl)piperazine, and the like.

Application of the piperazine compounds to the textile material, for example, cellulose acetate or cellulose ethyl ether, is made from an aqueous dispersion of the same, whether applied before, after or during the dyeing of the goods. The amount of these protective agents to be applied is small, an economical quantity being from 1 to 2 parts per 100 parts of the textile material. Taken on the weight of the dyestuff in the case of simultaneous dyeing and application, 1 to 5 parts of the piperazine compounds generally will suffice. The amount used obviously will vary with the gas-fading propensity of the dyestuff employed as well as with the activity of the individual piperazine compounds.

Dispersions of the diaryl piperazines may be prepared by methods commonly in use for making aqueous dispersions of the dyestuffs employed for dyeing organic derivatives of cellulose, for example, they may be dissolved in an appropriate solvent and after the addition of an aqueous solution of a surface active material as a dispersing agent be brought into dispersion by agitation. The relatively concentrated dispersion can then be diluted with water to give a treating bath of the desired proportions. For simultaneous application of the anti-gas fading agents with the dyestuffs the dispersion of the gas fading agent is prepared in the same way and added to the dye bath. The dyeing operation and the finishing of the dyed and treated materials may be carried out following the usual practice.

Pretreatment of the undyed material and after treatment of the dyed material may be accomplished by simply padding the goods in the aqueous dispersion of the protective agent, squeezing the saturated goods, washing with water and drying. The aqueous dispersion may be at room temperature or, if found advantageous or desirable, it may be warmed before application.

The treated materials may be tested to determine the resistance of the dyeings to gas fading by submitting them to an accelerated fading test in which the dyed material containing the protective agent and a control not so treated are exposed in a confined space to burner gases from the combustion of illuminating gas in a Bunsen burner.

The following specific examples are illustrative of the invention, to which, however, it is not intended that it be limited. Parts are by weight. While these examples specifically illustrate that aspect of the process wherein the protective agent and dyestuff are simultaneously applied, it can be readily seen that they likewise serve to illustrate the aspects of the process wherein the goods are to be pretreated or after-treated with the protective agent, the operations being similar with the exception of so much as is peculiar to the dyeing.

*Example 1*

1 to 2 parts of 1,4-diphenyl piperazine and 0.6 part of 1-monomethylamino-4-(2-hydroxyethyl) amino anthraquinone are dissolved in a 1:1 alcohol-acetone mixture or other appropriate solvent. 40 parts of a 5% aqueous solution of the oleic acid amide of methyl taurine, sodium salt or other suitable dispersing agent is added and the whole agitated to form a dispersion. 5000 parts of warm water (45–55° C.) is stirred into the dispersion. Into this dye bath is entered 100 parts of cellulose acetate silk in the form of yarn or fabric, after which the temperature of the bath is gradually raised to 80–90° C. The acetate silk is worked in the bath for an hour at this temperature. After the dyeing operation has been completed, the dyed and treated acetate silk is removed, washed with a dilute aqueous soap solution, rinsed with water and dried. The acetate silk is dyed in a blue shade of excellent resistance to gas fading as shown by exposing the material for long intervals of time to the combustion gases from a Bunsen burner burning illuminating gas.

*Example 2*

1 to 2 parts of 1,4-di-p-tolyl piperazine and 0.6 part of 1,4-di(monohydroxyethylamino) anthraquinone are dissolved in a 1:1 alcohol-acetone mixture. 40 parts of a 5% aqueous solution of the oleic acid amide of methyl taurine, sodium salt is added and the mixture agitated to cause dispersion. 5000 parts of warm water (110–130° F.) is stirred into the dispersion. Into this dye bath is entered 100 parts of cellulose acetate fabric and the temperature of the bath then gradually raised to 175–195° F. The acetate silk is worked in the bath for one hour at the latter temperature. The dyed goods are removed from the bath, washed with a dilute aqueous soap solution, rinsed with water and dried. The gas fading resistance of the treated blue dyeing is excellent.

While our invention has been specifically illustrated in connection with the treatment of dyeings on cellulose acetate, dyeings on other textile materials made of or containing organic derivatives of cellulose may be treated in like manner to improve the fastness of their colorations to gas fumes, whether the dyeings are made with the dyestuffs of the foregoing examples or with other cellulose acetate dyestuffs, anthraquinone or azo, particularly those dyeing in blue shades, for instance, 1,4,5,8-tetraaminoanthraquinone, 1,4-di(monomethylamino) - anthraquinone, 1-methylamino -4 - (2 - hydroxy - ethyl) aminoanthraquinone, 1,4 - diamino - 5 - nitro-anthraquinone, 1-amino- 4 -anilidoanthraquinone, 4-(4-amino - phenylazo) nitrobenzene, 4-(2-hydroxy-4-nitrophenylazo) - N, N - di-(2-hydroxyethyl) - m-toluidine, 6-(2-bromo-4,6-dinitrophenylazo)-3-hydroxy-7-methyl-N-secondary butyl-1,2,3,4-tetrahydroquinoline, 4-(2,4 - dinitrophenylazo) - N,N - di(2 - hydroxyethyl) - m - toluidine, 4 - (2-bromo - 4,6 - dinitrophenylazo) - N,N-diethyl - 5-methyl-o-anisidine, and 4-(2-chloro-4,6-dinitrophenylazo)-1-naphthylamine.

As various other embodiments of the invention will occur to those skilled in the art, it is not intended that the scope of the patent be limited except as is required by the prior art and the appended claims.

We claim:

1. Textile material resistant to gas fading and stable to washing comprising a dyed organic derivative of cellulose containing a diaryl piperazine of the general formula:

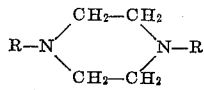

wherein R represents a member selected from the group consisting of monovalent aromatic hydrocarbon radicals and alkyl, alkoxy, halogen and cyano substituted monovalent aromatic hydrocarbon radicals.

2. Textile material resistant to gas fading and stable to washing comprising an organic derivative of cellulose colored with an aminoanthraquinone dyestuff and containing a diaryl piperazine of the general formula:

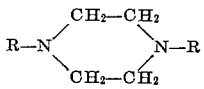

wherein R represents a member selected from the group consisting of monovalent aromatic hydrocarbon radicals and alkyl, alkoxy, halogen and cyano substituted monovalent aromatic hydrocarbon radicals.

3. Textile material resistant to gas fading and stable to washing comprising cellulose acetate colored with an aminoanthraquinone dyestuff and containing 1,4-diphenyl piperazine.

4. Textile material resistant to gas fading and stable to washing comprising cellulose acetate colored with an aminoanthraquinone dyestuff and containing 1,4-di-p-tolyl piperazine.

5. A process for improving the resistance to gas fading of dyeings which are normally subject to fading when exposed to acid gas fumes on textile material comprising an organic derivative of cellulose which comprises incorporating in the textile material a compound having an affinity for the material and stable to gas fading and washing comprising a 1,4-diaryl piperazine of the general formula:

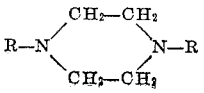

wherein R represent a member selected from the group consisting of monovalent aromatic hydrocarbon radicals and alkyl, alkoxy, halogen and cyano substituted monovalent aromatic hydrocarbon radicals.

6. A process for improving the resistance to gas fading of dyeings which are normally subject to fading when exposed to acid gas fumes on textile material comprising cellulose acetate which comprises incorporating in the textile material a compound having an affinity for the material and stable to gas fading and washing comprising a 1,4-diaryl piperazine of the general formula:

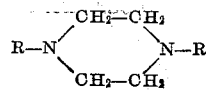

wherein R represents a member selected from the group consisting of monovalent aromatic hydrocarbon radicals and alkyl, alkoxy, halogen and cyano substituted monovalent aromatic hydrocarbon radicals.

7. A process for simultaneously dyeing and treating textile material comprising an organic derivative of cellulose which comprises dyeing the textile material from an aqueous dispersion of the dyestuff which additionally contains dispersed therein a compound having an affinity for the material and stable to gas fading and washing comprising a 1,4-diaryl piperazine of the general formula:

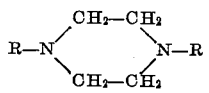

wherein R represents a member selected from the group consisting of monovalent aromatic hydrocarbon radicals and alkyl, alkoxy, halogen and cyano substituted monovalent aromatic hydrocarbon radicals.

8. A process for simultaneously dyeing and treating textile material comprising cellulose acetate which comprises dyeing the textile material from an aqueous dispersion of the dyestuff which additionally contains dispersed therein a compound having an affinity for the material and stable to gas fading and washing comprising a 1,4-diaryl piperazine of the general formula:

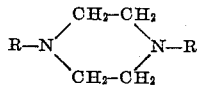

wherein R represents a member selected from the group consisting of monovalent aromatic hydrocarbon radicals and alkyl, alkoxy, halogen and cyano substituted monovalent aromatic hydrocarbon radicals.

9. A process for simultaneously dyeing and treating textile material comprising cellulose acetate which comprises dyeing the textile material from an aqueous dispersion of the dyestuff which additionally contains dispersed therein a compound having an affinity for the material and stable to gas fading and washing comprising 1,4-diphenyl piperazine.

10. A process for simultaneously dyeing and treating textile material comprising cellulose acetate which comprises dyeing the textile material from an aqueous dispersion of the dyestuff which additionally contains dispersed therein a compound having an affinity for the material and stable to gas fading and washing comprising 1,4-di-p-tolyl piperazine.

HARRY W. GRIMMEL.
ALFRED GUENTHER

REFERENCES CITED

The following references are of record in the file of this patent:

UNITED STATES PATENTS

| Number | Name | Date |
|---|---|---|
| 1,930,232 | Ellis | Oct. 10, 1933 |
| 2,083,122 | Olpin | June 8, 1937 |
| 2,148,655 | Seymour | Feb. 28, 1939 |
| 2,176,506 | McNally | Oct. 17, 1939 |
| 2,255,090 | Tinker | Sept. 9, 1941 |
| 2,298,401 | McNally | Oct. 13, 1942 |
| 2,307,973 | Tischbein | Jan. 12, 1943 |

FOREIGN PATENTS

| Number | Country | Date |
|---|---|---|
| 558,784 | Great Britain | Jan. 20, 1944 |

OTHER REFERENCES

Rayon Textile Monthly for June 1945, page 97 (297). (Available in Scientific Library of Patent Office.)